United States Patent
Ivanov et al.

(10) Patent No.: US 9,476,504 B2
(45) Date of Patent: Oct. 25, 2016

(54) SLIDING ELEMENT, IN PARTICULAR PISTON RING, HAVING RESISTANT COATING

(71) Applicant: Federal-Mogul Burscheid GmbH, Burscheid (DE)

(72) Inventors: Yuriy Ivanov, Bergisch Gladbach (DE); Marcus Kennedy, Dusseldorf (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 14/420,733

(22) PCT Filed: Jul. 30, 2013

(86) PCT No.: PCT/EP2013/065993
§ 371 (c)(1),
(2) Date: Feb. 10, 2015

(87) PCT Pub. No.: WO2014/023615
PCT Pub. Date: Feb. 13, 2014

(65) Prior Publication Data
US 2015/0240944 A1    Aug. 27, 2015

(30) Foreign Application Priority Data

Aug. 10, 2012 (DE) .................. 10 2012 214 284

(51) Int. Cl.
| | |
|---|---|
| *F16J 9/26* | (2006.01) |
| *C23C 28/04* | (2006.01) |
| *C23C 28/00* | (2006.01) |
| *C23C 28/02* | (2006.01) |

(52) U.S. Cl.
CPC .................. *F16J 9/26* (2013.01); *C23C 28/02* (2013.01); *C23C 28/04* (2013.01); *C23C 28/042* (2013.01); *C23C 28/044* (2013.01); *C23C 28/046* (2013.01); *C23C 28/32* (2013.01); *C23C 28/34* (2013.01); *C23C 28/341* (2013.01); *C23C 28/343* (2013.01); *C23C 28/347* (2013.01)

(58) Field of Classification Search
USPC ........ 277/442; 428/408, 457, 701, 704, 336, 428/472, 698
See application file for complete search history.

(56) References Cited

U.S. PATENT DOCUMENTS

| | | | |
|---|---|---|---|
| 2004/0219294 A1 | 11/2004 | Massler et al. | |
| 2006/0046060 A1* | 3/2006 | Rorig | C23C 14/024 428/408 |
| 2007/0054125 A1* | 3/2007 | Akari | C23C 14/024 428/408 |
| 2007/0059529 A1* | 3/2007 | Hosenfeldt | C23C 14/0605 428/408 |
| 2008/0220257 A1 | 9/2008 | Dekempeneer | |

(Continued)

FOREIGN PATENT DOCUMENTS

| | | |
|---|---|---|
| DE | 10018143 B4 | 10/2001 |
| DE | 102006029415 A1 | 1/2008 |

(Continued)

*Primary Examiner* — Archene Turner
(74) *Attorney, Agent, or Firm* — Robert L. Stearns; Dickinson Wright, PLLC

(57) ABSTRACT

The present application relates to a sliding element, in particular a piston ring, having a coating (10) on a substrate (12), which forms at least one sliding surface of the sliding element. The coating (10) has, from the inside outwards, a carbide or nitride layer (16), then a carbide-containing (preferably PVD-) TLC layer (17), then a metal-free PVD-TLC layer (22) and then a metal-free PACVD-TLC layer (18).

17 Claims, 1 Drawing Sheet

(56) References Cited

U.S. PATENT DOCUMENTS

| | | | |
|---|---|---|---|
| 2009/0186206 A1* | 7/2009 | Ito | C23C 14/0605 428/216 |
| 2011/0101620 A1 | 5/2011 | Hoppe et al. | |
| 2011/0268946 A1* | 11/2011 | Fischer | C23C 30/00 428/217 |
| 2012/0205875 A1* | 8/2012 | Kennedy | C23C 16/0281 277/442 |
| 2013/0042845 A1 | 2/2013 | Kennedy et al. | |

FOREIGN PATENT DOCUMENTS

| | | |
|---|---|---|
| DE | 102008016864 B3 | 10/2009 |
| DE | 102008042747 A1 | 4/2010 |
| DE | 102009046281 B3 | 11/2010 |
| DE | 102009028504 B3 | 1/2011 |
| EP | 2083095 A2 | 7/2009 |
| JP | 2000128516 A | 5/2000 |
| JP | 2004010923 A | 1/2004 |

\* cited by examiner

SLIDING ELEMENT, IN PARTICULAR PISTON RING, HAVING RESISTANT COATING

BACKGROUND OF THE INVENTION

1. Technical Field

The invention relates to a sliding element, in particular a piston ring, having a coating on a substrate, which forms at least one running surface.

2. Related Art

Sliding elements such as, for example, piston rings, pistons or cylinder liners in internal combustion engines must work throughout a service life as long as possible, both with as little friction as possible and with a low level of wear. In order to reduce the friction directly coupled with the fuel consumption of the internal combustion engine, it is essentially known to provide such sliding elements with a friction-reducing coating. For this purpose, a coating of DLC (diamond-like carbon) is used, for example, which is essentially known to the person skilled in the art.

Several methods are available for applying a DLC layer. A method often used recently because of the high possible coating rates and relatively low costs is the PACVD method (plasma-assisted chemical vapor deposition), which is described, for instance, in DE 195 13 614 C1.

Another method that is basically used for coating a substrate with a DLC layer is the PVD method (physical vapor deposition), which is described, for instance, in DE 102 03 730 B4.

The disadvantage of DLC layer deposition, in particular by means of the PACVD method, is that the high mechanical residual stresses generated thereby are associated with a relatively poor resistance of the coating, and therefore such layers cannot be used, without difficulties, in sliding elements.

A sliding element is apparent from DE 10 2009 028 504 B3, in which a coating comprises two DLC layers, namely a metal-containing DLC layer and a metal-free DLC layer. The metal-containing DLC layer was thereby applied by means of a PVD method and the metal-free DLC layer was applied by means of a PACVD method, whereby different microstructures can be created in the layers. The PACVD-DLC layer, i.e. the metal-free DLC layer of the prior art, has the high mechanical residual stresses described above. It is assumed in the prior art that these high residual stresses of the PACVD-DLC layer can be compensated by the metal-containing PVD-DLC intermediate layer.

However, the inventors have found that even the method described in DE 10 2009 028 504 B3 is not yet optimal with regard to the resistance of the layer during the entire service life of the engine. Specifically, it may occur occasionally with the sliding element described in the prior art that the layers flake off under heavy loads, and thus the sliding elements deteriorate with respect to their wear properties and friction properties.

A DLC layer system is apparent from DE 100 18 143 B4, which has an adhesive layer on a substrate, a transition layer and a cover layer, in which the adhesive layer can be applied by plasma-assisted coating, in particular by means of a PVD method or a plasma CVD method, and the cover layer of diamond-like carbon can be applied by means of plasma CVD deposition.

JP 2004-10923 A relates to a sliding element having a coating which comprises, from the inside outwards, a chrome layer, a chrome-carbon layer, a DLC layer with graduated hardness and a hard DLC layer.

A piston ring is apparent from DE 2008 016 864 B3, which comprises, from the inside outwards, an adhesive layer, a metal-containing amorphous carbon layer and a metal-free amorphous carbon layer.

DE 10 2009 046 281 B3 relates to a sliding element, in particular a piston ring, in which a CrN layer, an Me ($C_xN_y$) layer and a DLC layer are provided from the inside outwards.

Finally, US 2008/0220257 A1 describes a substrate with a coating which comprises, from the inside outwards, an intermediate layer of carbon with a Young's modulus of more than 200 GPa and an amorphous carbon layer with a Young's modulus of less than 200 GPa.

SUMMARY OF THE INVENTION

Starting from the above-stated prior art, the object of the present invention is to provide a sliding element that is improved further in respect of the combination of coefficients of friction and wear properties. In particular, the object consists of improving the wear properties in respect of a potential flaking-off of parts of the coating in the engine under heavy loads.

The sliding element, in particular the piston ring, has a coating on the substrate, which forms at least one running surface. The coating has, from the inside outwards, a (preferably PVD) carbide or nitride layer, then a carbide-containing (preferably PVD) DLC layer, then a metal-free PVD-DLC layer and then a metal-free PACVD-DLC layer.

By using the structure of the coating, it is possible to homogenize transitions between the individual PVD layers, and thus to create a particularly good adhesion between the individual layers. Furthermore, owing to the affinity of metal-free PVD-DLC and PACVD-DLC layers, the adhesion between the two metal-free DLC layers can also be improved. By graduating the process parameters, it is also possible to create a graduated transition between the respective layers of the coating. A smooth transition between the individual layers realized in this manner and an affinity between the PVD-DLC layer and the PACVD-DLC layer prevents any kind of flaking off, even under heavy loads in the engine.

The coating according to the invention is, at least in part, applied on at least one running surface of the sliding element. However, it is also possible that the coating extends over the entire running surface and is also formed, wholly or in part, on surfaces adjacent to the running surface. The flanks of a piston ring are examples of such adjacent surfaces.

The PVD-DLC layer can be applied on the substrate, or a binding layer previously deposited on the substrate, in particular by sputtering or an electric arc method. The PACVD-DLC layer is created preferably by using a plasma with a plasma generator frequency of at least 1 kHz.

In a preferred embodiment, a binding layer is applied between the substrate and the carbide or nitride layer, which preferably consists of chrome or titanium. This binding layer is occasionally also designated as adhesive layer and improves the adhesion of the entire layer system, in particular of the DLC layers, on the substrate. Cast iron or steel can be preferably used as the basic material for the substrate. These materials have turned out to be advantageous in particular in connection with piston rings.

Advantageously, the carbide or nitride layer contains tungsten carbide, CrN, Cr2N, TiN or CrTiN.

What is to be understood by the carbide-containing (preferably PVD-) DLC layer, is a DLC layer to which a carbide is admixed. The amorphous carbon contained in the DLC layer with a significant proportion of sp3 bonds (the significant proportion of the carbon sp3 bonds cross-linked without long-range order is at least 20%, preferably at least 50%) thereby forms a matrix for the added material. Preferably, the carbide-containing DLC layer additionally contains tungsten or chrome. Particularly preferably, the carbide-containing DLC layer contains tungsten carbide, in particular in the form of nanocrystalline tungsten carbide precipitates. This feature is also beneficial for the sliding properties of the sliding element.

Advantageously, a run-in layer is formed on the PACVD-DLC layer, which is softer than the PACVD-DLC layer. Such a soft run-in layer is beneficial for the properties of the sliding element during the run-in phase of the sliding element, for example in a new engine or as spare part in an engine already run-in.

Preferably, the PVD-DLC layer has several sub-layers. These sub-layers can be connected with each other, for example by graduated transitions which result from gradually modified process parameters. Thus, it is possible to optimally blend the adhesive properties of the PVD-DLC layer and the carbide-containing DLC layer on the one hand, and the carbide-containing DLC layer and the (preferably PVD) carbide or nitride layer on the other hand, without giving rise to a distinct discontinuity within the layer that is usually associated with a reduced adhesion of the involved layers with respect to each other.

In a preferred embodiment, the PACVD-DLC layer has a thickness between 30% and 70%, preferably between 35% and 65%, of the total thickness of the coating. This preferred layer thickness ratio results in a good resistance of the coating without incorporating an unnecessarily large amount of additional material into the coating.

Advantageously, the total coating thickness is 2 µm to 50 µm. This coating thickness enables a particularly good balance between the friction coefficient and the wear properties of the sliding element, especially with regard to a piston ring for an internal combustion engine.

Furthermore, it is preferred that the PVD-DLC layer has a hardness of 700 HV 0.002 to 2800 HV 0.002 and, alternatively or additionally, that the PACVD-DLC layer has a hardness of 1200 HV 0.002 to 3000 HV 0.002. The described hardness range of the PVD-DLC layer and the PACVD-DLC layer has also turned out to be particularly advantageous with regard to the combination of friction coefficient and wear resistance.

In a preferred embodiment, the PVD-DLC layer has an e-modulus of 150 GPa to 350 GPa and/or the PACVD-DLC layer has an e-modulus of 160 GPa to 400 GPa.

Basically, it is preferred that at least the running surface of a sliding element is, at least in part, coated by the coating according to the invention. For economic reasons, it can also be preferred, however, that the coating is also applied on the running flanks and on the transition between the running surface and the running flanks or on the surfaces adjacent to the running surface.

Advantageously, the carbide-containing DLC layer and/or the PVD-DLC layer and/or the PACVD-DLC layer contains hydrogen. This has turned out to be beneficial with regard to the strength of the coating.

It is particularly preferred for the preferably provided binding layer that it has a thickness of 1 µm maximum in order to unfold its effect while applying as little as possible on the substrate, and thus using as little material as possible.

THE DRAWINGS

WAYS OF IMPLEMENTING THE INVENTION

Figure 1:
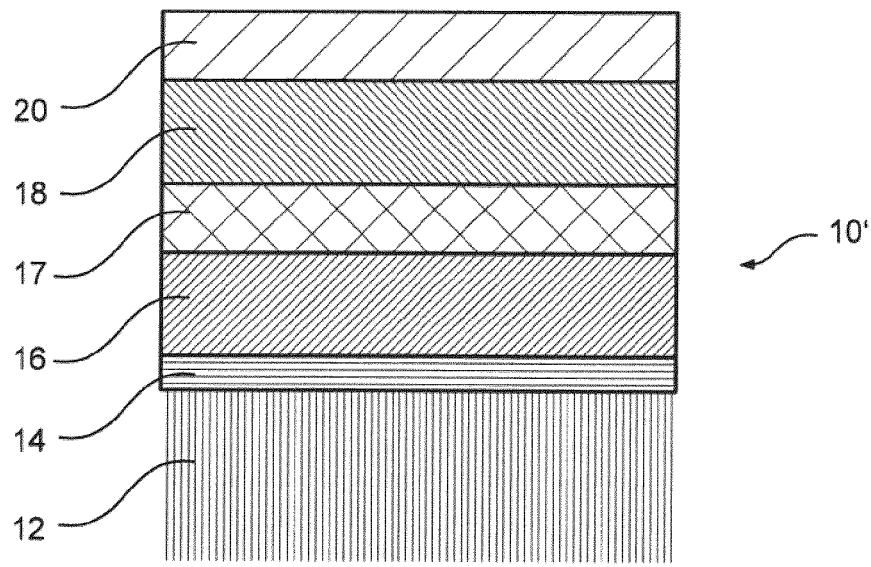
FIG. 1 shows a schematic side view of a sliding element with a coating of the prior art.

FIG. 1 shows a layer structure of the prior art. A coating 10' of a sliding element on a substrate 12 comprises a binding layer 14 consisting of chrome and applied on the substrate 12, which could alternatively also consist of titanium. A carbide layer 16 is applied on the binding layer 14, which could alternatively also be configured as a nitride layer. A carbide-containing DLC layer 17 is applied on the carbide layer 16. In the present example, the carbide-containing DLC layer contains tungsten carbide, carbon and hydrogen.

A PACVD-DLC layer 18, which has a particularly good combination of friction and wear properties, is sometimes applied on the carbide-containing DLC layer 17. Optionally, a run-in layer 20 is applied on the PACVD-DLC layer 18, which is used, for example, if the sliding element is supposed to have particular properties during a run-in phase, in particular a lower surface hardness.

Figure 2:
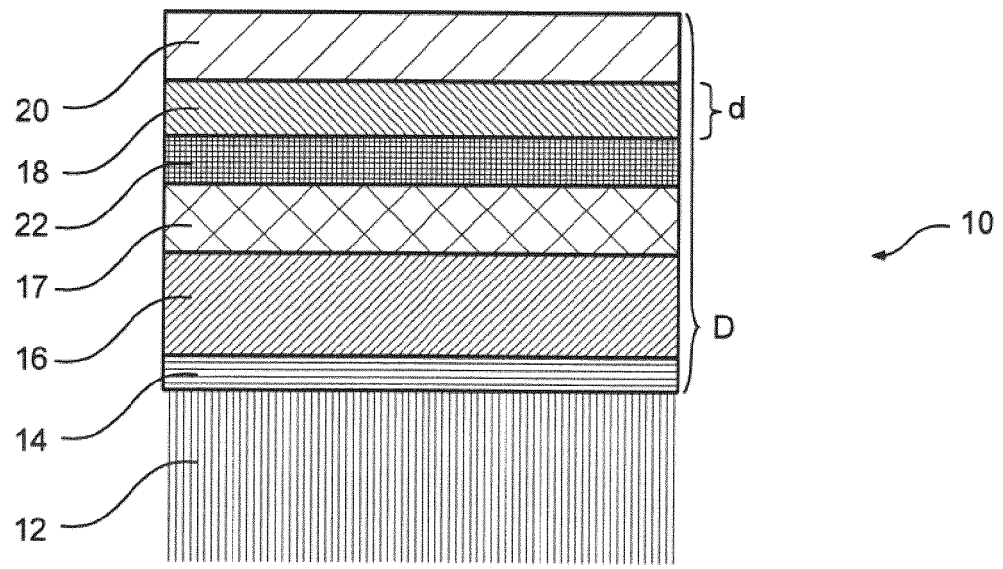
FIG. 2 shows a schematic side view of a sliding element according to a preferred embodiment of the present invention.

FIG. 2 shows a preferred embodiment of the present invention. As compared to the coating 10' described above with reference to FIG. 1, the coating 10 according to the embodiment shown in FIG. 2 differs in particular in that a metal-free PVD-DLC layer 22 is applied between the carbide-containing DLC layer 17 and the metal-free PACVD-DLC layer 18. This PVD-DLC layer 22 significantly improves the adhesion between the metal-free PACVD-DLC layer 18 and the carbide-containing DLC layer 17 owing to its affinity. Thus, the resistance of the coating 10 can be considerably improved as compared to the prior art, even under heavy engine loads.

Furthermore, a thickness d of the PACVD-DLC layer is indicated in FIG. 2, which has a proportion of 40% to 60%, preferably between 40% and 50%, of the total layer thickness D of the coating.

The invention claimed is:

1. A sliding element, having a coating on a substrate, which forms at least one running surface of the sliding element, wherein the coating has, from the inside outwards,
    a PVD-carbide or PVD-nitride layer,
    then a carbide-containing PVD-DLC layer,
    then a metal-free PVD-DLC layer and
    then a metal-free PACVD-DLC layer.

2. The sliding element according to claim 1, wherein a binding layer is applied between the substrate and the carbide-containing PVD-DLC layer.

3. The sliding element according to claim 2, wherein the binding layer consists of chrome or titanium.

4. The sliding element according to claim 1 wherein at least one of the carbide-containing PVD-DLC layer, the PVD-DLC layer and the PACVD-DLC layer contains hydrogen.

5. The sliding element according to claim 1, wherein the PVD-carbide or PVD-nitride layer contains tungsten carbide or CrN or Cr2N or TiN or CrTiN.

6. The sliding element according to claim 1, wherein the carbide-containing PVD-DLC layer contains tungsten or chrome.

7. The sliding element according to claim 1, wherein a run-in layer is formed on the PACVD-DLC layer, which is softer than the PACVD-DLC layer.

8. The sliding element according to claim 1, wherein the PVD-DLC layer comprises several sub-layers.

9. The sliding element according to claim 1, wherein the PACVD-DLC layer has a thickness between 30% and 70% of the total thickness of the coating.

10. The sliding element according to claim 9, wherein the total thickness of the coating is 2 μm to 50 μm.

11. The sliding element according to claim 1, wherein the PVD-DLC layer has a hardness of 700 HV 0.002 to 2800 HV 0.002.

12. The sliding element according to claim 1, wherein the PACVD-DLC layer has a hardness of 1200 HV 0.002 to 3000 HV 0.002.

13. The sliding element according to claim 1, wherein the PVD-DLC layer has an e-modulus between 150 GPa and 350 GPa.

14. The sliding element according to claim 1, wherein the PACVD-DLC layer has an e-modulus between 160 GPa and 400 GPa.

15. The sliding element according to claim 1, wherein the PVD-DLC layer is applied by reactive sputtering or an electric arc method and the PACVD-DLC layer is applied by a plasma with a generator frequency of at least 1 kHz.

16. The sliding element according to claim 1, wherein the sliding element is a piston ring.

17. The sliding element according to claim 9, wherein the thickness of the PACVD-DLC layer is between 35% to 65% of the total thickness of the coating.

* * * * *